United States Patent [19]

Conley

[11] 4,111,167
[45] Sep. 5, 1978

[54] CARBURETOR BY-PASS

[75] Inventor: Earl Conley, Salmon Arm, Canada

[73] Assignee: Cyril Cecil Kane, Salmon Arm, Canada; a part interest

[21] Appl. No.: 732,326

[22] Filed: Oct. 14, 1976

[30] Foreign Application Priority Data

Sep. 3, 1976 [CA] Canada .................................. 260459

[51] Int. Cl.² ............................................ F02D 11/10
[52] U.S. Cl. .............................. 123/102; 123/198 DB
[58] Field of Search ................... 123/102, 198 DB, 98, 123/DIG. 11, 97 B, 119 D

[56] References Cited

U.S. PATENT DOCUMENTS

| | | | |
|---|---|---|---|
| 1,299,250 | 12/1972 | Chambers et al. | 123/DIG. 11 |
| 1,365,889 | 9/1974 | Swatman et al. | 123/DIG. 11 |
| 2,443,562 | 6/1948 | Hieger et al. | 123/97 B |
| 2,733,696 | 2/1956 | Schneider | 123/97 B |
| 3,486,595 | 12/1969 | Turner | 123/97 B |
| 3,575,148 | 4/1971 | Walter et al. | 123/10 Z |
| 3,752,131 | 8/1973 | Tsumura et al. | 123/97 B |
| 3,782,346 | 1/1974 | Tatsutomi et al. | 123/97 B |
| 3,821,943 | 7/1974 | Toda et al. | 123/97 B |

*Primary Examiner*—Charles J. Myhre
*Assistant Examiner*—R. A. Nelli
*Attorney, Agent, or Firm*—Shlesinger, Arkwright, Garvey and Dinsmore

[57] ABSTRACT

An air by-pass device for internal combustion engines comprising a first valve assembly positioned between the carburetor and the intake manifold and having a passageway providing fluid communication between the carburetor and manifold, and a valve member in the passageway for closing off the passageway to the fuel mixture, means for conveying ambient air to the intake manifold through the first valve assembly, a second valve assembly operatively connected with the air conveying means for controlling the flow of air therein, first and second solenoids for operating respectively the first and second valve assemblies simultaneously, and an electric line connecting the solenoids with a source of electric current and including switches responsive to the accelerator pedal position and the flow of air from the engine cooling fan so that when the accelerator pedal is released at a time when the air flow from the engine cooling fan exceeds the normal flow at idle, the solenoids will be energized for cutting off the fuel flow to the engine and admitting ambient air thereto.

8 Claims, 5 Drawing Figures

CARBURETOR BY-PASS

Normal carburetion injection systems feed fuel into the engine even when the pressure is taken off the gas pedal because of the vacuum produced in the cylinders on the downstroke of the piston and this invention will overcome this problem by by-passing air into the cylinders and closing off the fuel supply, and will only allow fuel flow to keep the motor running at idling speeds or when pressure is again applied to the gas pedal.

Figure 1:
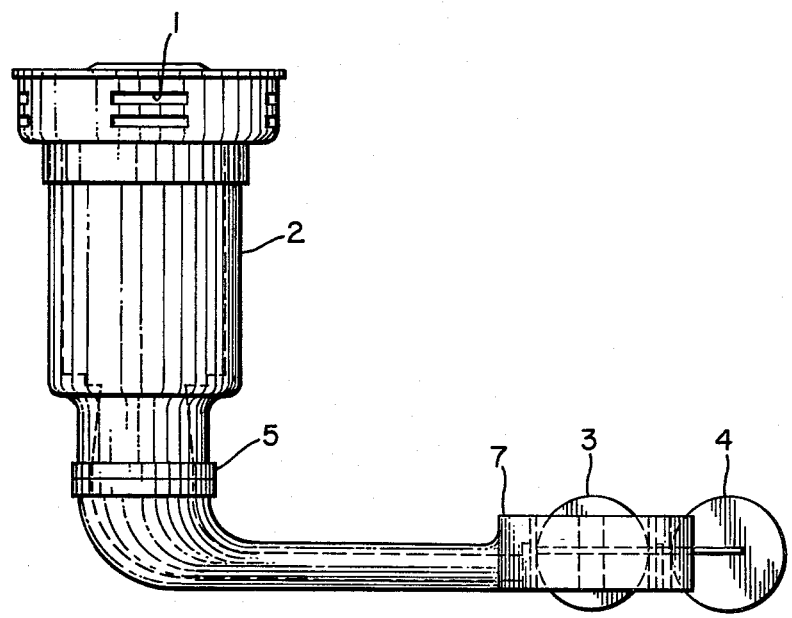
FIG. 1 is a side elevation view of the apparatus forming this invention.
Figure 2:
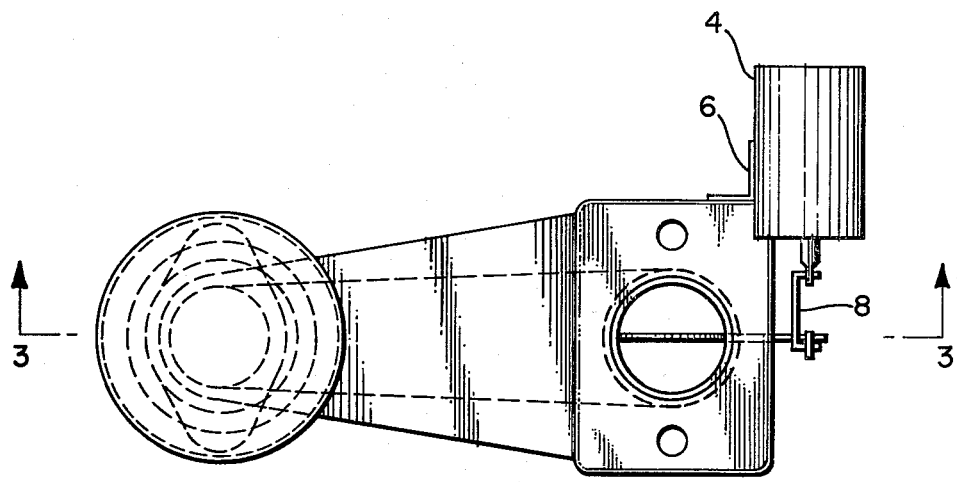
FIG. 2 is a top plan view of the device of FIG. 1.
Figure 3:
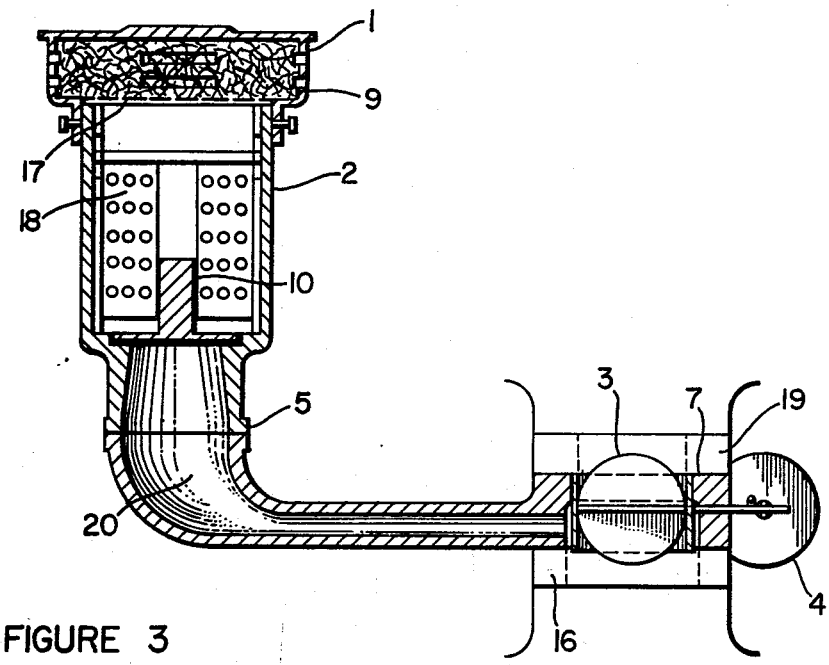
FIG. 3 is a transverse section view of the device of FIG. 1.

As illustrated on the drawings, the invention primarily consists of an air intake, air passage chamber, valve and solenoid arrangements.

The solenoids are operated electrically through manual switch 13 on the dashboard, switch 14 operated by the gas pedal arm and a sail switch 15 operated by air flow from the radiator fan.

The manual switch is normally left in the "on" position as it is primarily a safety cut off and ensures that power will be available for the electrical control system.

At normal or high engine speeds and with the gas pedal depressed, switch 14 is open and air flow from the radiator fan keeps the sail switch 15 closed and the engine operates normally drawing fuel through the carburetor.

When pressure is taken off the gas pedal, switch 14 is closed thus completing the electrical circuit and solenoids 2 and 4 are energized. Solenoid 4 through linkage 8 closes the butterfly valve 3 thus closing off fuel flow through the carburetor and at the same time, solenoid 2 pulls up plunger and valve 10 from the seat allowing air to pass into the intake manifold through intake openings 1, around the outside of the solenoid coil, through openings in casting 17 and opening 12 of flange 7.

As the speed of the engine decreases to a predetermined setting, the sail switch contact opens because of reduced air flow and the solenoids are then de-energized and engine then operates again under normal carburetion injection. This avoids the problem of the engine stopping while parking, in low speed operation or going downhill.

Rib spacers 18 are provided in the solenoid casing allowing air around the coil.

The air intake is provided with filter media 9 and screen 17 and the coil is held in place by a spring clip.

The air intake assembly is removeable for cleaning while the complete intake and solenoid assembly is removeable at flange 5 for servicing.

Solenoid 4 is held in place by clamp 6 and is also removeable for servicing or replacement.

Figure 4:
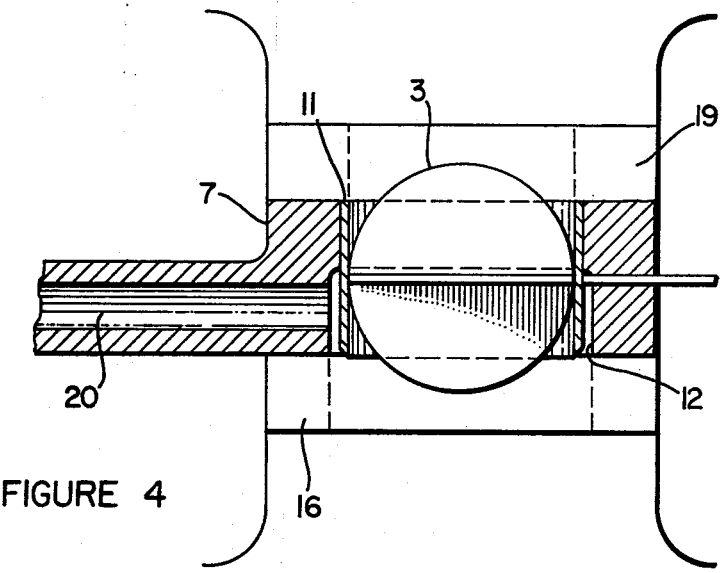
FIG. 4 is an enlarged view of a portion of the device shown in FIG. 3.
Figure 5:
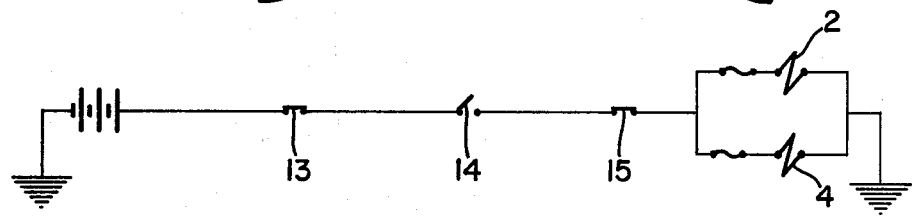
FIG. 5 is a schematic drawing of the electrical control system.

FIG. 4 is an enlarged view of the flange assembly 7 showing the butter-fly valve 3, insert 11 and air passages 20 and illustrates how this flange assembly fits between the carburetor flange 19 and intake manifold flange 16.

Solenoids 2 and 4 are protected from current overload by fuses 21.

Minor modifications can be made to the invention by eliminating solenoid 2 and operating two butterfly valves from solenoid 4 by a linkage arrangement. The air intake arrangement shown can also be deleted with the air taken from the air intake normally provided on the engine. However, the principle of operation remains the same furthermore, this device may be modified to fit any carburetor and intake manifold flanges.

The embodiments of the invention in which an exclusive property or privilege is claimed are defined as follows:

1. An air by-pass device for internal combustion engines comprising:
    a first valve assembly adapted to be sealingly mounted between a carburetor assembly and the engine intake manifold, said valve assembly including a housing having a passageway extending therethrough providing fluid communication between said carburetor and said manifold, and a valve member operable to move between open and and substantially closed positions in said passageway,
    means for conveying ambient air to said intake manifold through said first valve assembly,
    a second valve assembly operatively connected with said air conveying means for controlling the flow of air therein,
    first and second solenoids for operating respectively said first and second valve assemblies simultaneously,
    an electric line for connecting said first and second solenoids with a source of electric current,
    a normally closed manual switch in said electric line capable of interrupting the electric current,
    a switch member in said electric line and interconnected with the accelerator such that said switch is open when the accelerator pedal is depressed and closed when the accelerator pedal is released to idle position,
    a sail switch in said electric line and positioned in the flow of air from the engine cooling fan and adjusted so as to be closed when the air flow from the fan exceeds the normal flow at idle and open when the air flow equals the normal flow at idle,
    whereby when said accelerator pedal is released at a time when the air flow from the engine cooling fan exceeds normal flow at idle, said first and second solenoids will be energized for closing said first valve assembly and cutting off fuel flow to the engine and opening said second valve assembly for admitting ambient air to the engine.

2. An air by-pass device as in claim 1 and wherein said first valve assembly and said air conveying means are integrally associated, external air being admitted to said housing by means of an inlet port in said passageway beneath said valve member.

3. An air by-pass device as in claim 2 and wherein said passageway comprises upper and lower concentric interconnected bores, said lower bore being substantially larger in cross-section that said upper bore, and a sleeve member positioned within said upper bore and of length sufficient to extend substantially through said housing, such that the external surface of said sleeve member and the internal surface of said lower bore define an annular chamber into which air may pass via said inlet port.

4. An air by-pass device as in claim 3 wherein said valve member is a butterfly valve mounted on shaft means such that the axis of rotation of said valve is substantially normal to said passageway, and wherein said shaft means extends outwardly of said housing.

5. An air by-pass device as in claim 4 wherein said first solenoid is connected to said valve shaft means so as to affect rotation thereof when solenoid reponds to an electrical signal.

6. An air by-pass device as in claim 5 wherein said air conveying means comprises a passageway formed as an extension of said housing and adapted to an end remote from said housing to be interconnected with said second valve assembly.

7. An air by-pass device as in claim 1 wherein said second valve assembly comprises: a housing open at its upper and lower extremities, the lower open end being adapted for fluid interconnection with said air conveying means, a chamber within said housing formed at one end into a valve seat; said second solenoid being positioned within said chamber and held in spaced relation from the sides of such chamber by rib means; and a valve member actuated by said solenoid to move from a normally closed position against said valve seat to an operable open position away from said seat.

8. An air by-pass device as in claim 7 wherein air intake means are releasably mounted on the upper open end of said housing said means including an air filter and screen.

* * * * *